US012549986B2

(12) United States Patent
Bansal et al.

(10) Patent No.: US 12,549,986 B2
(45) Date of Patent: Feb. 10, 2026

(54) STRUCTURED MINIMIZATION OF DRIVE TEST MEASUREMENT DATA FROM A USER EQUIPMENT TO A NETWORK

(71) Applicant: QUALCOMM Incorporated, San Diego, CA (US)

(72) Inventors: Hargovind Prasad Bansal, Hyderabad (IN); Tom Chin, San Diego, CA (US); Shankar Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 17/999,818

(22) PCT Filed: Jun. 29, 2021

(86) PCT No.: PCT/US2021/039556
§ 371 (c)(1),
(2) Date: Nov. 23, 2022

(87) PCT Pub. No.: WO2022/015499
PCT Pub. Date: Jan. 20, 2022

(65) Prior Publication Data
US 2023/0180042 A1  Jun. 8, 2023

(30) Foreign Application Priority Data
Jul. 17, 2020 (IN) .............................. 202041030556

(51) Int. Cl.
*H04W 24/10* (2009.01)
(52) U.S. Cl.
CPC .................................. *H04W 24/10* (2013.01)
(58) Field of Classification Search
CPC ...................................................... H04W 24/10
See application file for complete search history.

(56) References Cited

U.S. PATENT DOCUMENTS

2015/0044973 A1* 2/2015 Siomina ................ H04W 24/10
 455/67.11
2018/0324869 A1* 11/2018 Phuyal .................. H04W 72/23
(Continued)

FOREIGN PATENT DOCUMENTS

EP  2849480 A1  3/2015
EP  3771249 A1  1/2021
(Continued)

OTHER PUBLICATIONS

Part 1 of 4; pp. 1-332; 3GPP: "3rd Generation Partnership Project, Technical Specification Group Radio Access Network, Evolved Universal Terrestrial Radio Access (E-UTRA), Radio Resource Control (RRC), Protocol Specification (Release 16)", 3GPP TS 36.331 V16.1.0 (Jul. 2020), Technical Specification, pp. 1-1098, Jul. 14, 2020, Section 5.6, pp. 447-454.
(Continued)

*Primary Examiner* — Abdeltif Ajid
(74) *Attorney, Agent, or Firm* — Arent Fox, LLP

(57) ABSTRACT

Aspects for sending structured measurement data based on a specific type of measurement requested by a network are disclosed. A user equipment (UE) may receive a request from a base station for minimization of driving test (MDT) data corresponding to a specified type of measurement by the UE from a larger plurality of available MDT measurements that the UE can make. The UE can send the requested data including a structure report having results for the specified measurement type to the base station. In other aspects, a base station may send a request to a UE for minimization of driving test (MDT) data corresponding to a type of measurement by the UE. The base station may receive the requested data corresponding to the type of measurement.

29 Claims, 10 Drawing Sheets

(56) References Cited

U.S. PATENT DOCUMENTS

| | | | |
|---|---|---|---|
| 2019/0088351 A1* | 3/2019 | Takarada | A61B 5/14532 |
| 2020/0067664 A1* | 2/2020 | Kim | H04W 56/0045 |
| 2022/0201703 A1* | 6/2022 | Tomala | H04W 24/10 |
| 2023/0297882 A1* | 9/2023 | Pantelidou | G06F 9/5044 706/12 |

FOREIGN PATENT DOCUMENTS

| | | |
|---|---|---|
| WO | 2019183803 A1 | 10/2019 |
| WO | 2020067812 A1 | 4/2020 |

OTHER PUBLICATIONS

Part 2 of 4; pp. 333-685; 3GPP: "3rd Generation Partnership Project, Technical Specification Group Radio Access Network, Evolved Universal Terrestrial Radio Access (E-UTRA), Radio Resource Control (RRC), Protocol Specification (Release 16)", 3GPP TS 36.331 V16.1.0 (Jul. 2020), Technical Specification, pp. 1-1098, Jul. 14, 2020, Section 5.6, pp. 447-454.

Part 3 of 4; pp. 686-1045; 3GPP: "3rd Generation Partnership Project, Technical Specification Group Radio Access Network, Evolved Universal Terrestrial Radio Access (E-UTRA), Radio Resource Control (RRC), Protocol Specification (Release 16)", 3GPP TS 36.331 V16.1.0 (Jul. 2020), Technical Specification, pp. 1-1098, Jul. 14, 2020, Section 5.6, pp. 447-454.

Part 4 of 4; pp. 1046-1098; 3GPP: "3rd Generation Partnership Project, Technical Specification Group Radio Access Network, Evolved Universal Terrestrial Radio Access (E-UTRA), Radio Resource Control (RRC), Protocol Specification (Release 16)", 3GPP TS 36.331 V16.1.0 (Jul. 2020), Technical Specification, pp. 1-1098, Jul. 14, 2020, Section 5.6, pp. 447-454.

"3rd Generation Partnership Project, Technical Specification Group Radio Access Network, Evolved Universal Terrestrial Radio Access (E-UTRA), Radio Resource Control (RRC), Protocol specification (Release 16)", 3GPP Draft TS 36.331, V16.1.0 (Jul. 2020), Draft 36331-G10, 3rd Generation Partnership Project, Mobile Competence Centre, 650, Route Des Lucioles, F-06921 Sophia-Antipolis Cedex, France, Jul. 14, 2020, XP051908674, 1076 Pages, paragraph 5.6.5.1, 5.6.5.3 and 5.6.10. p. 447-454. Figure 5.6.5.1-1 and 5.6.10.

"3rd Generation Partnership Project, Technical Specification Group Radio Access Network, NG-RAN, F1 Application Protocol (F1AP) (Release 16)", 3GPP Standard Technical Specification, 3GPP TS 38.473, V16.2.0 (Jul. 2020), 3rd Generation Partnership Project, Mobile Competence Centre, 650, Route Des Lucioles, F-06921 Sophia-Antipolis Cedex, France, vol. RAN WG3, No. V16.2.0, Jul. 16, 2020, pp. 1-363, XP051925485, Paragraph 9.3.1.88 Paragraph 9.3.1.150 Paragraph 9.3.1.152 Paragraph 9.3.1.153 Paragraph 9.3.1.154.

"3rd Generation Partnership Project, Technical Specification Group Radio Access Network, NR, User Equipment (UE) Radio Access Capabilities (Release 16)", 3GPP TS 38.306, V16.1.0 (Jul. 2020), Draft 38306-G10, 3rd Generation Partnership Project (3GPP), Mobile Competence Centre, 650, Route Des Lucioles, F-06921 Sophia-Antipolis Cedex, France, Jul. 16, 2020 (Jul. 16, 2020), XP051909173, 105 Pages, Paragraph 4.2.17, Paragraph 4.2.18.

International Search Report and Written Opinion—PCT/US2021/039556—ISA/EPO—Oct. 6, 2021.

Qualcomm Incorporated: "Streaming based MDP", 3GPP Draft, 3GPP TSG-RAN WG3 Meeting#108-e, R3-203337, 3rd Generation Partnership Project (3GPP), Mobile Competence Centre, 650, Route Des Lucioles, F-06921 Sophia-Antipolis Cedex, France, vol. RAN WG3, No. Jun. 1, 2020-Jun. 12, 2020, May 22, 2020 (May 22, 2020), XP051889191, 3 Pages, paragraph 2.

* cited by examiner

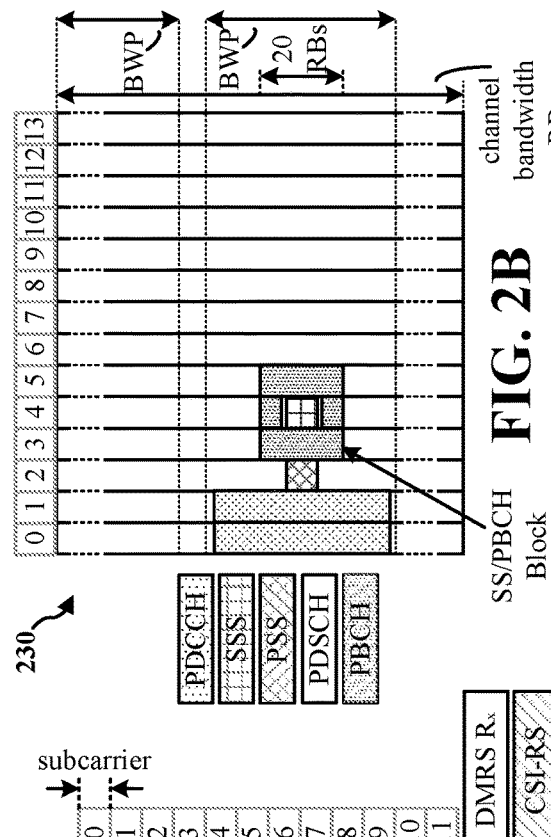
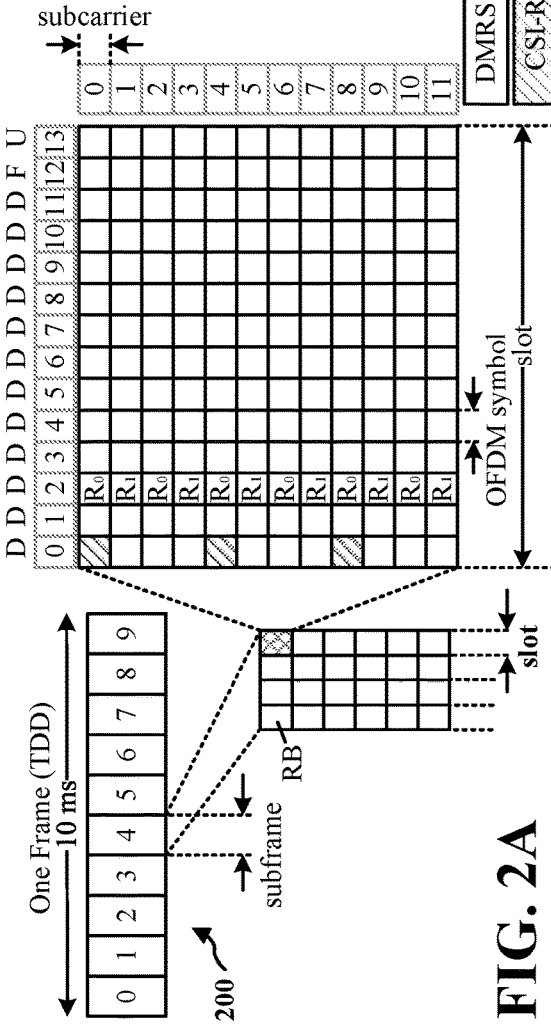
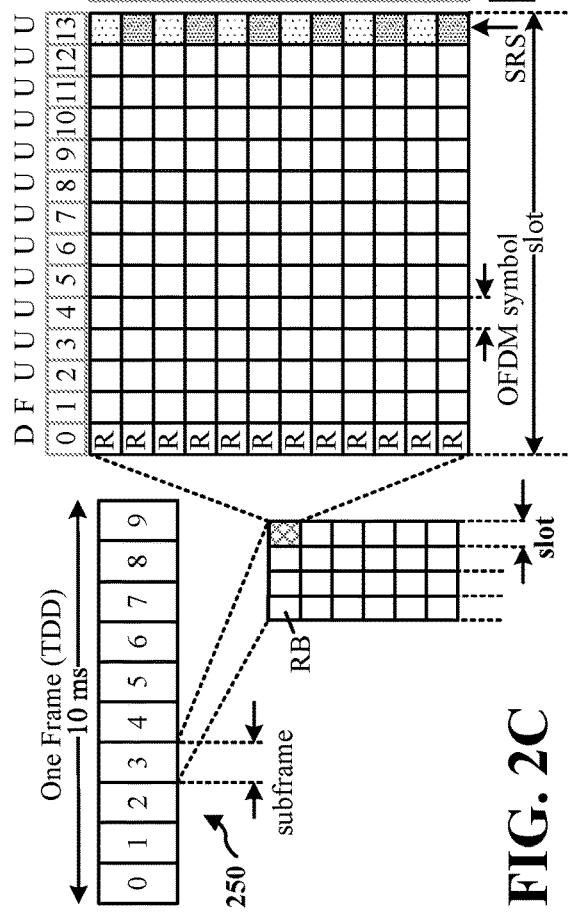

STRUCTURED MINIMIZATION OF DRIVE TEST MEASUREMENT DATA FROM A USER EQUIPMENT TO A NETWORK

CROSS-REFERENCE TO RELATED APPLICATIONS

This application is a National Phase entry of PCT Application No. PCT/US2021/039556, entitled "STRUCTURED MINIMIZATION OF DRIVE TEST MEASUREMENT DATA FROM A USER EQUIPMENT TO A NETWORK" and filed on Jun. 29, 2021, which claims priority to Indian Application No. 202041030556, entitled "STREAMING MINIMIZATION OF DRIVE TEST MEASUREMENTS FROM A USER EQUIPMENT TO A NETWORK" and filed on Jul. 17, 2020, all of which are expressly incorporated by reference herein in their entirety.

BACKGROUND

Technical Field

The present disclosure relates generally to communication systems, and more particularly, to sending measurement data over a network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Accordingly, in an aspect of the disclosure, a method and an apparatus are provided. The apparatus may be a user equipment (UE). The UE may include a processor configured to receive, from a base station, a request for structured minimization of driving test (MDT) data. The requested data may correspond to at least one type of MDT measurement specified by a base station from a larger plurality of available types of MDT measurements that can be performed by the UE. The processor may also be configured to send the data including results corresponding to the specified at least one type of MDT measurement to the base station.

The apparatus may also be a base station. The base station may include a processor configured to send a request to a UE for structured minimization of driving test (MDT) data. The requested MDT data may correspond to at least one type of MDT measurement specified by the base station from a larger plurality of available MDT measurement types that can be performed by the UE. The processor may further be configured to receive the requested, structured data corresponding to the type of measurement.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
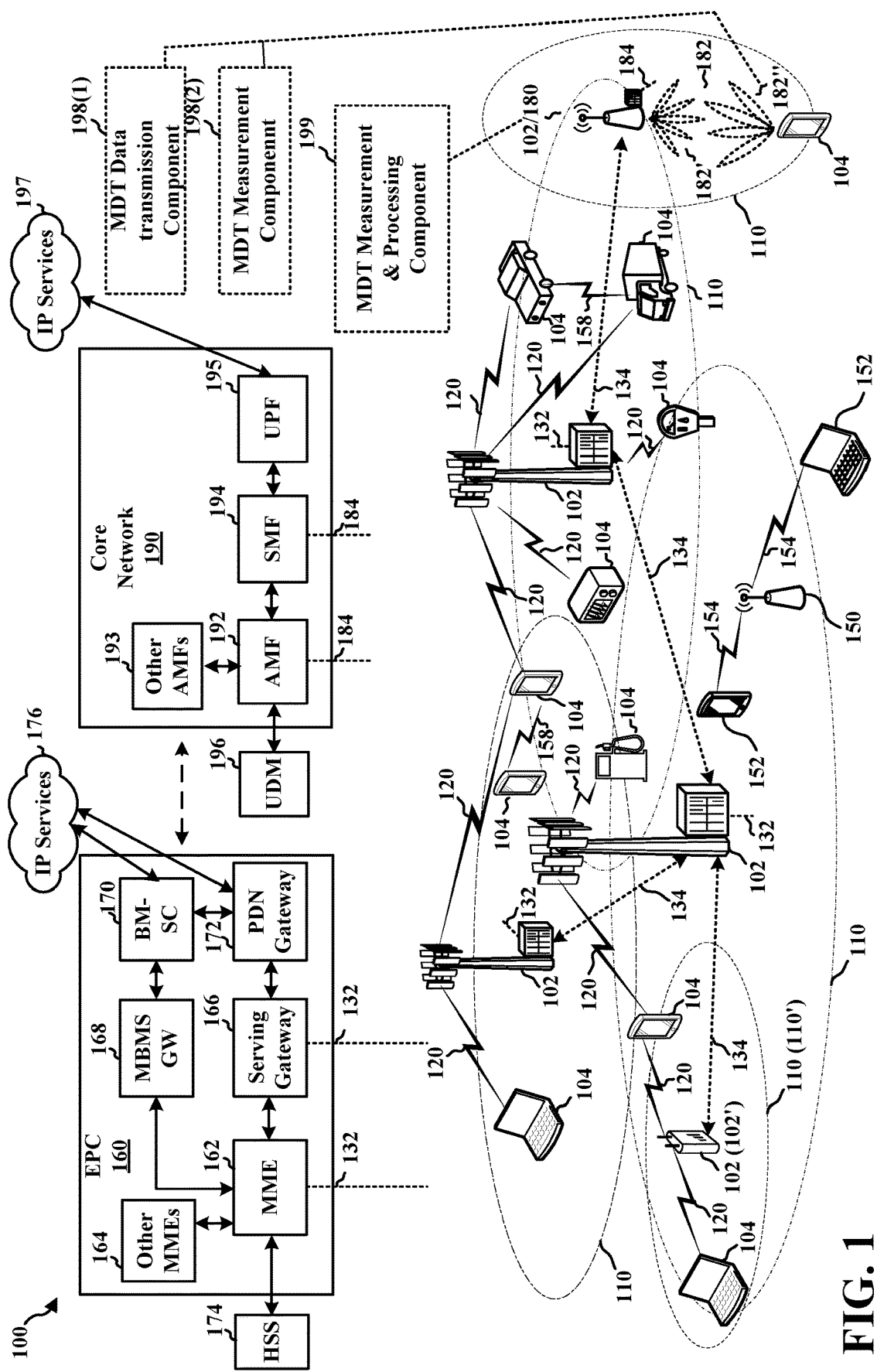
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Minimization of Drive Tests (MDT) measurements may be configured by a network and performed by a UE. Applicants have observed that, responsive to a base station request, all configured test results have been conventionally sent to the network via an RRC connection as part of one measurement report file from the UE. Applicants have also observed that, as new measurement types have been continuously added over the years, the size of this data file has increased dramatically. Applicants have also observed that, due to the current eight kilobyte maximum RRC transfer capability, this file is segmented into multiple RRC messages. Applicants have further observed that, transferring such a large file from the UE to the network can quickly drain the UE battery power. Moreover, Applicants have observed that, the RRC signaling overhead incurred by the segmenting also places an added strain on UE and network resources. In addition, Applicants have observed that the network core must filter the large data file to extract the different measurement results for forwarding to the different entities that need particular MDT measurement results.

Some of the techniques described herein may help reduce or eliminate these problems. For example, one technique may include logging MDT measurement reports at the UE as a plurality of single files, each file based on a corresponding MDT measurement type. The UE may receive a network request for structured MDT data, including, for example, a measurement report that is circumscribed to the specific types MDT measurement type(s) needed by the network at the time of request, rather than requesting a single data file that includes all measurements as is conventionally performed. Responsive to the network's request, the data corresponding to only to the requested measurement type(s) may be sent to the network. The structured nature of the data is broadly intended to take any of several forms. For example, the structured MDT data may simply be organized in an easily-recognizable or network friendly manner. In one exemplary configuration, the data can be structured such that the base station (or other network entity) can readily identify the MDT measurement type(s), e.g., without having to segment a large amount of data corresponding to all the different MDT measurements into their constituent types, for example. In other configurations, the structured data may optionally represent a protocol or format by the receiving network for enabling fast and easy retrieval and analyses of one or more individual MDT measurement types from a larger group of such types. However, this need not be the case, and the structured MDT data need not correspond to a defined format or protocol. As another example, in some configurations, the structured MDT data may simply refer to data representing the MDT measurement(s) requested by the network. The MDT measurement data may optionally include a structured report with results corresponding to at least one measurement type specified by the base station from a larger plurality of available measurements that can be performed by the UE. Further, in lieu of performing a single, large file transfer to send all the data to the base station at one time, the data specific to the requested measurement type may be sent to the base station. The UE may send the data as a single file in a structured report or as part of a single, non-real time data stream to the base station. UE battery power and network bandwidth consumption can be reduced as a result. Further, the tailored nature of the data sent to the base station responsive to the base station's request may reduce, if not altogether eliminate, the need for RRC segmentation. That is to say, since only the specific, structured MDT measurement data identified in the network request is sent at a time, the requirement for filtering the received data by the network can be reduced or eliminated altogether, depending on the circumstances.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, where a "processor" is referenced in this disclosure, the processor is deemed to include one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include an MDT measurement & processing component 199. The base station 180 may use component 199 during an RRC connection to configure a UE 104 to perform various types of MDT measurements (including providing measurement intervals and a measurement duration), to log the data into measurement reports to be received from a UE 102 pertaining to various MDT measurement types, and to receive the measurement reports and forward them to the core network for distributing to the appropriate entity. These measurement types may include, for example, serving/neighbor cell measurements, Multimedia Broadcast/Multicast service Single Frequency Network (MBSFN) measurements, wireless LAN (WLAN) measurements, Bluetooth measurements, location measurements, etc. Component 199 may also be configured to perform other actions involving the MDT measurement reports, including processing MDT information, making requests for different measurement reports such as MDT measurement type requests, and sending and receiving information concerning MDT activities and measurement reports to and from the UEs 104, other base stations 102/180, the core network 190, and other network entities/clients that may require the data relevant to specific UE measurement types. In one configuration, component 199 is configured to include, in a measurement type request, an indication that the base station supports receiving MDT measurement data in data streams.

The UE 104 may include an MDT data transmission component 198(1) and an MDT measurement component 198(2). The MDT measurement component 198(2) of the UE 104 may be configured to receive configuration information, including measurement intervals and a measurement duration, from the base station 180 during an RRC connection for subsequently performing MDT measurements during a UE idle state. The MDT component 198(2) may further be configured to perform the different MDT measurements configured previously by the base station 180. The MDT component 198(2) may be configured to perform these measurements during the specified measurement intervals and over the length of the MDT measurement duration. After the measurements, when the RRC connection is released, the UE 104 enters the idle state. The MDT component 198(2) may further be configured to log the measurement data, including storing information corresponding to different types of measurements, into different respective data files, for example.

The MDT data transmission component 198(1) may be configured to receive MDT measurement type requests from the base station 180 during an RRC connection that occurs subsequent to performing the measurements. The MDT data transmission component 198(1) may be configured to receive an indication in the measurement type request that the base station supports, or is capable of, receiving MDT data in the requested. Responsive to this type of request, component 198(1) may be configured to send a structured measurement report as one or more files or as a non-real time data stream to the base station 180 which includes measurement data corresponding to the specific type of measurement identified in the MDT measurement type request from the larger group of available MDT measurements. Component 198(1) may also be configured, in the case where the base station identifies in the MDT measurement type request more than one type of MDT measurement, to send during successive time periods different time periods. MDT data transmission component 198(1) may also be configured for performing other MDT-related functions.

The MDT measurement & processing component 199, MDT data transmission component 198(1) and MDT measurement component 198(2) may be implemented, in part or in whole, as software stored in memory and executed on one or more general purpose or specialized processors. Alternatively, these components 198(1), 198(2) and 199 may be implemented, in part or in whole, in firmware, or as hardware including one or more digital signal processors (DSPs), gate arrays, SoCs, digital logic circuits, application specific integrated circuits (ASICs), and the like.

Although the following description may be focused on MDT measurement reports, the concepts described herein may be applicable to other similar areas, such as other types of network measurements, including signal-strength and round-trip time (RTT) measurements, for example. Further, although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
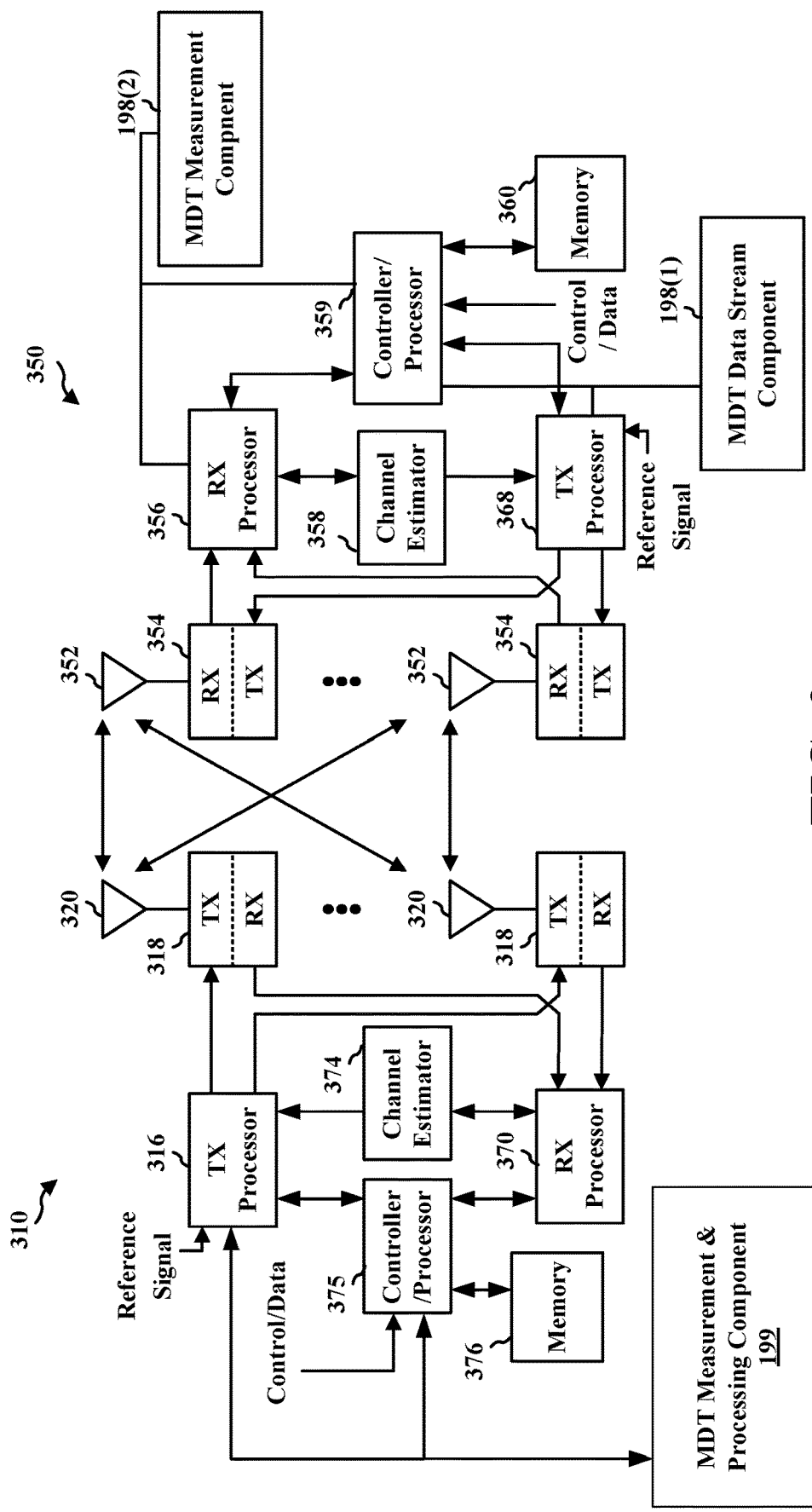
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198(1) and 198(2) of FIG. 1. Similarly, at least one of the TX processor 316, the RX processor 370, and the controller/processor 375 may be configured to perform aspects in connection with MDT measurement & processing component 199 of FIG. 1. Alternatively, in some configuration as shown in FIG. 3, any portion or each of MDT measurement & processing component 199, MDT data transmission component 198(1) and MDT measurement component 198(2) may be configured, in part or in whole, as one or more special-purpose processors, or in other hardware implementations, e.g., those described with reference to FIG. 1.

Current implementations of the MDT measurements are configured by the base station, performed and logged by the UE, and transmitted to the base station as a single data file including measurement report data for all of the configured measurement types. Upon the base station's request for the measurement report, the UE proceeds to transfer the single file to the base station.

This conventional limitation introduces increasingly intolerable limitations into the respective LTE and 5G-NR architectures. Over the past several years beginning at release 9 of the relevant 3GPP standard up to and including release 15, a number of new measurement types have been added to the MDT measurement-reporting scheme. Because all measurement results for all measurement types are transmitted by the UE back to the network as a single, very large file, the growing number of measurements requested by the network has naturally resulted in a measurement report that is much larger than when the initial specification was first promulgated. When this file is transmitted back to the base station responsive to the base station's information request, the file transfer drains UE battery life while introducing additional network bandwidth impositions and straining network resources.

A further shortcoming of the current approach relates to the nature of the radio resource control (RRC) connection, which currently can transfer messages with a maximum size of eight (8) kilobytes. Because the UE's MDT measurement report can be hundreds of kilobytes to several megabytes or more (depending in part on the number of measurements stored on the file and the amount of data generated by those measurements during the specified intervals), the single file must be segmented into a number of smaller 8 KB data segments and reconstructed at the recipient side. Among other problems, this partitioning leads to an undesirable imposition of network processing resources, with back to back RRC signaling overhead occupying an appreciable portion of the data transfer.

In addition, the single file must be filtered by the core network to partition the file into a plurality of files such that each partitioned file includes only the data pertaining to one measurement type. This filtering is necessary because different types of measurement information may be needed by different clients or other network entities. Only after the filtering process can the data can be forwarded to the necessary client.

Figure 4:
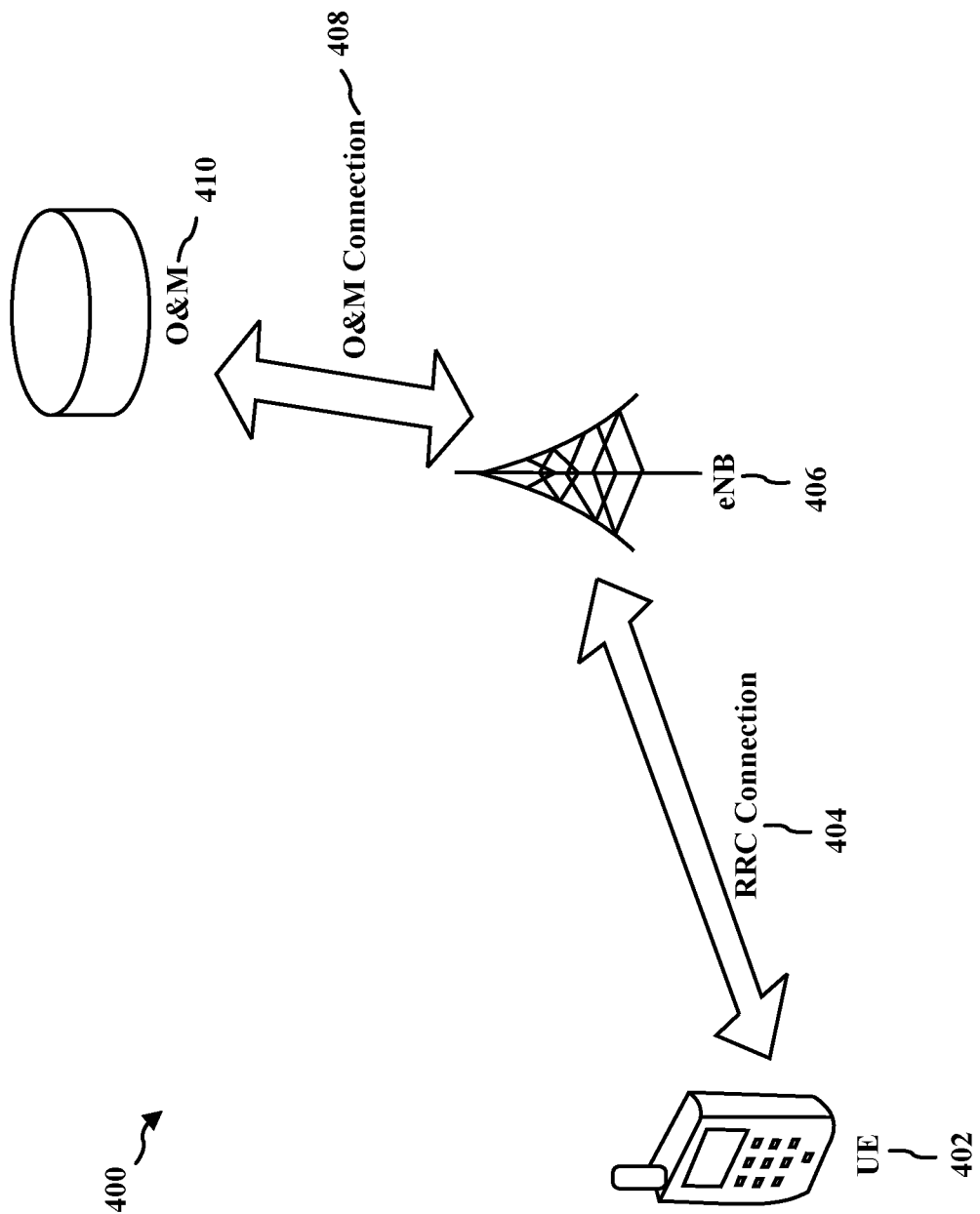
FIG. 4 is a conceptual diagram illustrating an example of a UE establishing an RRC connection with a base station and the base station forwarding measurement data to an Operations and Management facility.

To this end, FIG. 4 is a conceptual diagram 400 illustrating an example of a UE 402 establishing an RRC connection with a base station (eNB 406) and the base station forwarding measurement data to an Operations & Management (operations, administration and management/maintenance) facility 410. Responsive to a base station 406 request, UE 402 transfers the MDT measurement report as a large file over the established RRC connection 404. The UE 402 may include with the reported MDT data one or more parameters from the UE's memory (such as a trace reference, trace recording session, or trace collection entity (TCE) identifier, for example). The base station 406, which may be an eNB, gNB, or other type of base station enumerated above, may receive and reconstruct the file. The base station 406 may then extract the one or more parameters to correlate the data at the TCE that belongs to the same trace (MDT session). The base station 406 may use the TCE ID to obtain the IP address of the TCE, which in turn identifies where the MDT data should be forwarded.

Referring still to FIG. 4, the base station 406 may establish an O&M connection 408 to O&M entity 410, which can be an entity of the core network that performs the filtering of the measurement data by type. That data can finally be passed to the correct network entities as described above.

Figure 5:
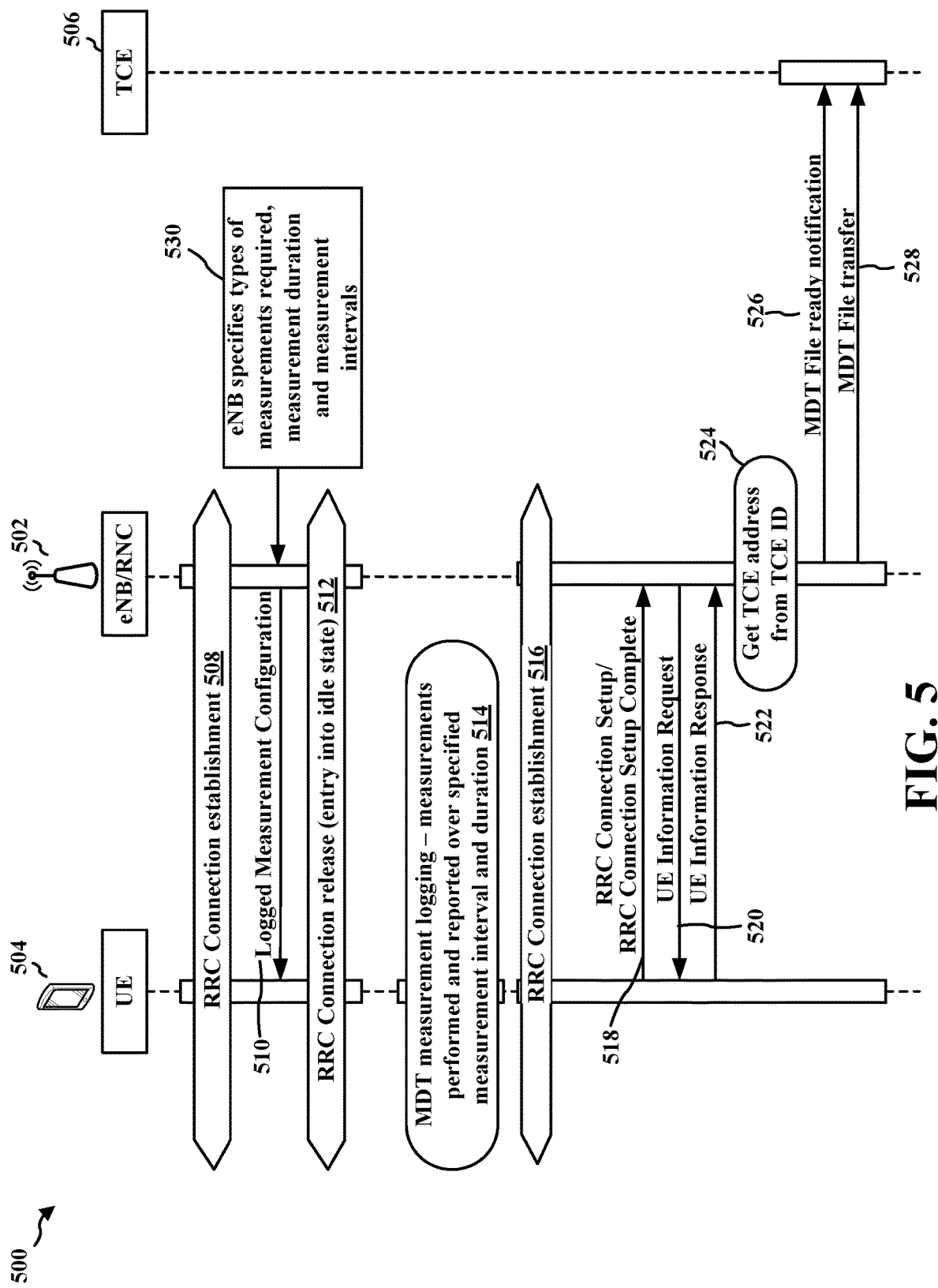
FIG. 5 is a timing diagram illustrating an example of logged MDT reporting between a UE and a network.

FIG. 5 is a timing diagram 500 illustrating an example of logged MDT reporting procedure between a UE 504 and a network including a base station 502 and a TCE 506. An RRC connection may be established at 508. Thereupon, at 510, a logged measurement configuration may be performed in which the base station 502 sends one or more messages to the UE 504 specifying all of the types of MDT measurement that the UE 504 should perform, the measurement intervals for each of the measurements, and the overall MDT measurement duration (see, e.g., block 530). Thus, via this signaling 510, the base station 502 may configure the UE 504 to perform each MDT measurement required by the network.

After the MDT measurements are configured, when the RRC connection is released at 512, the UE 504 may enter the idle state. During the idle state, the UE 504 may perform the measurements and log the results as configured by the base station 502. For example, the UE 504 may perform an MDT measurement at each logging interval until a logging duration timer is expired, after which the UE 504 may perform an MDT measurement for another interval. For example, if the logging duration is ten minutes and the logging interval is 320 milliseconds (ms), then during each 320 ms interval one MDT measurement may be performed and the interval may be repeated for ten minutes. After all the measurements are performed, a large amount of data corresponding to all of the measurement reports is ready to be sent.

Next, another RRC connection may be established and completed at 516 and 518. During the RRC connection setup, the UE 504 may optionally provide an indication to the base station 502 that the measurement logging is complete. At 520, the base station 502 sends a UE information request to the UE 504 asking the UE 504 to send the MDT measurement report. Notably, in the signal 504, the base station may request the report without specifying measurement types, as is conventional. In response to the UE information request 520, the UE 504 may send a UE information response 522 in which the single MDT measurement report is transferred as a single large file and segmented as necessary for each of the (currently 8 KB max) RRC blocks. The multiple RRC segmented messages may be sent as discussed above, including all the signaling overhead and the attendant UE battery drain, consuming network time until the file transfer is finally complete—only to await the next transfer by the base station 502 and further filtering step by the network.

At 524, the base station 502 may obtain the TCE's address from the TCE ID, as described above. After sending to the TCE 506 an MDT file ready notification 526, the base station 502 may proceed to transfer the MDT file to the TCE 506 at 528, where the file may be further forwarded to the network core or portions thereof as necessary to filter the file and provide the individual measurement results to the correct entities.

Figure 6:
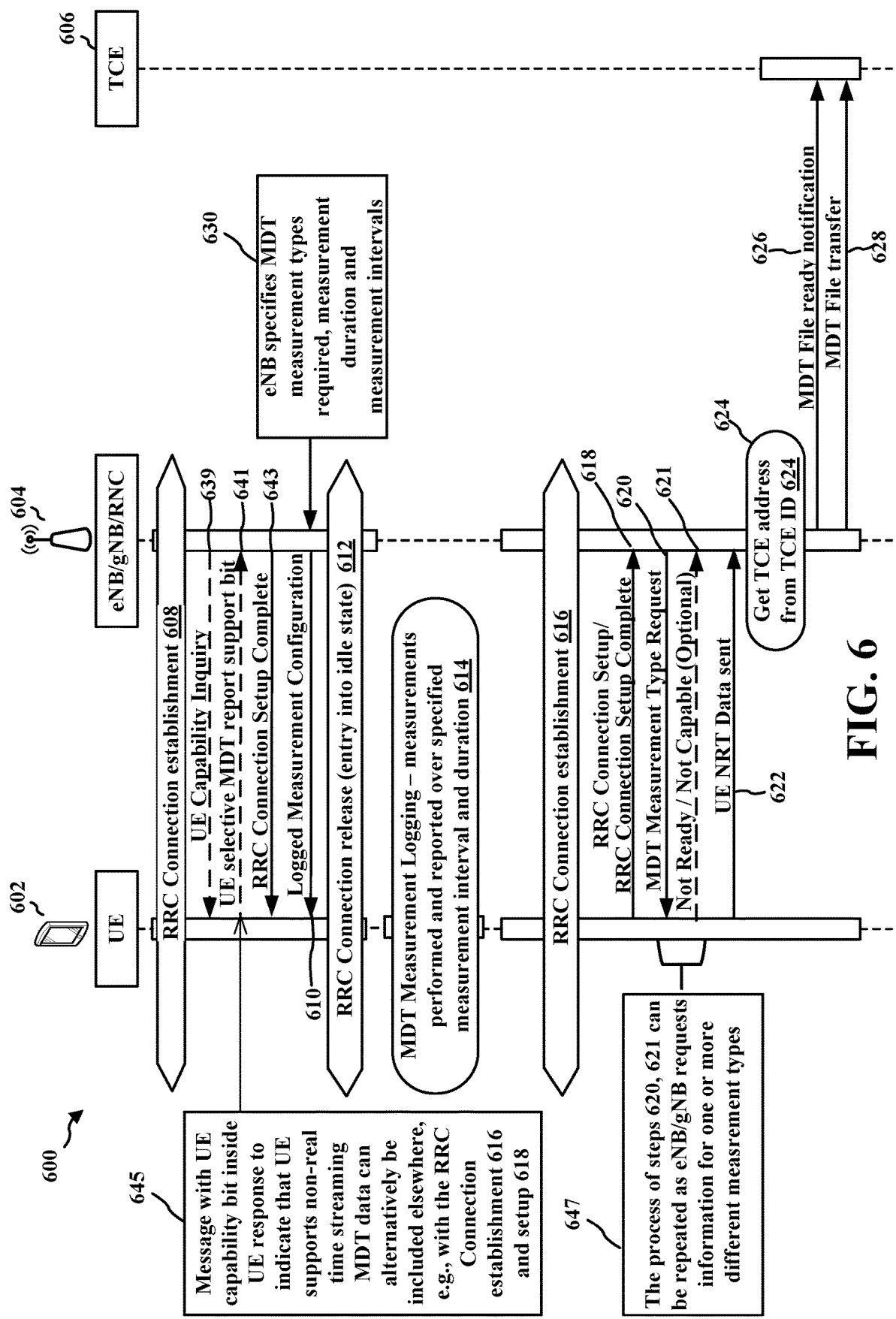
FIG. 6 is a timing diagram illustrating an example of logged MDT reporting including sending a requested type of measurement report from the UE to the network.

FIG. 6 is a timing diagram 600 illustrating an example of logged MDT reporting including sending or non-real time streaming a requested type of measurement report from the UE 602 to the network including base station 604 and TCE 606. As before, an RRC connection establishment process may be initiated (608). At 639, the network may issue a UE capability inquiry 639. The UE may respond with a UE capability information message 641, inside of which a new bit may be included to indicate UE capability for streaming Logged MDT for MDT measurement type requests. While the non-real time streaming may be used, this feature is optional and the data may be transmitted as a structured file or otherwise in any manner over the network. As described in block 645, the UE capable signal 641 can alternatively be included elsewhere, for example in with the subsequent RRC connection establishment and setup signal exchanges 616 and 618, and it need not be included in the current RRC connection. In some configurations, the base station 502 is already aware of the capability and it need not be explicitly conveyed by the UE 604. Thereupon, at 643 the RRC connection can be validated and completed. At 610, the base station signals the UE 602 and issues an indication of the measurement types the network requires, and the measurement duration and intervals, as in FIG. 5.

At 612, the RRC connection can be released, and the UE 604 may enter into an idle state. At 614, the UE 604 commences logging, and the UE 604 stores and accumulates MDT measurement results within its memory pertaining to the measurements configured in 610 by the base station 602. In various implementations, in lieu of storing all of the measurement data in one file, the UE 604 may store data corresponding to a single type of measurement result in one corresponding file, and the UE 604 may store data corresponding to another type of measurement result in another file, and so on for the remaining measurement intervals in the specified duration.

At 616, another RRC connection may be established. At 618, the UE 604 may indicate that the connection setup is complete, and in so doing, the UE 604 may indicate to the base station 602 that the MDT measurement results are ready. In one aspect of the disclosure, the base station 602 performs an MDT measurement type request at 620. In lieu of requesting the entire MDT measurement report as in request 520 of FIG. 5, the base station 602 in FIG. 6 may only request data corresponding to the type of measurement required by the network at the time of the request. The MDT measurement type request may in some configurations include an indication that the base station is "data stream capable", that is to say, the base station supports the capability of receiving non-real time measurement-type specific data streams in lieu of the conventional all-enveloping data file transfer. As noted above, the non-real time streaming need not be used and the data may be sent, e.g., over a control plane using conventional transmission techniques.

At 621, the UE 604 may optionally send a not ready/not capable indication 621 to the base station 602, in which case the devices may fall back to the legacy technique or in some configurations, the devices may omit the MDT exchange altogether. Otherwise, in one implementation, the UE 604 responds by sending a non-real time data stream or by sending directly data 622 corresponding only to the measurement report data for the type of measurement requested by the base station 602.

In various configurations, the base station 602 may in the MDT measurement type request 620 send a request for two or more MDT measurements required by the network at the time of the request. Here, the UE 604 sends the relevant measurement reports sequentially, with data corresponding to one type of measurement at a time. Thus in this case, at 622, the UE 604 may respond by sending first data that includes data corresponding to a first type of requested measurement, and thereafter second data that includes data corresponding to a second type of requested measurement, and so on until data is sent for all the types of measurements that were requested by the base station 602 in request 620.

In various configurations, the base station 602 may in step 620 make a request for a structured measurement report specific to one MDT measurement type (as above), in response to which the UE 604 may send the data including a report with results for that measurement report. At some later time, when the network informs the base station 602 that the information is necessary, for example, the base station 602 may make another MDT measurement type request for data corresponding to another type of MDT measurement, in response to which the UE 604 may respond by sending the data corresponding to that MDT measurement type at 622. At various stages during the same or different RRC connections at subsequent times, the base station 602 may issue yet additional MDT measurement type requests 620 in which data corresponding to other measurement types is requested. Thus the requests in these implementations can be made in a sequential manner for one or more data types, and that data is requested and sent only when the data is needed by the network in a structured manner, rather than being arbitrarily sent as one big measurement report.

After the measurement report corresponding to the requested measurement type(s) is received by the base station 602, the base station 602 may obtain a TCE address from the TCE ID sent with the data (624). The base station 602 may notify the TCE entity 606 of the anticipated transfer at 626 and thereafter the base station 602 may transfer the MDT data to the TCE 606 at 628, and the data may be forwarded to the entity that requires the information.

The technique of FIG. 6 has several benefits to both the UE 604 and the network. Because each measurement report can be transmitted to the base station as a single type of measurement data or corresponding result, the requirement of filtering the data by the network may be obviated or reduced, and instead the data can be directly sent to the network entity that needs it. Further, because the data can optionally be sent in non-real time streams by the UE 604 depending on the type of MDT measurement, the streams are typically much smaller, and may not exceed the RRC maximum data size, meaning that the requirement to segment the data into 8 KB chunks is reduced or eliminated. This in turn can minimize the amount of RRC signaling overhead required by the network, since different data segments do not have to be managed with corresponding RRC control information. Further, because each measurement report for a single type of MDT measurement may correspond to a single non-real time data stream (or the data is simply transmitted using conventional techniques), bandwidth and network resources are conserved. This technique also eliminates the conventional problems associated with UE battery drain, since the files streamed are substantially smaller and the UE battery power status can be revisited, if necessary, following the successful transmission of a single data stream.

While only the data logged for a requested type of measurement is sent, the UE performs and logs all measurements configured by the base station as before. Therefore, the UE keeps this information at its disposal, and it can be made incumbent on the network to determine what types of MDT data are needed and when, rather than the UE (which has far more limited processing resources compared with the network), to have to track this information. The network can issue MDT measurement type requests corresponding to the information it needs, and the UE can send that information as a data report formatted to be responsive to the base station's specific MDT requests, for example. The remaining measurement reports can be preserved in UE unless and until that information is needed.

Figure 7:
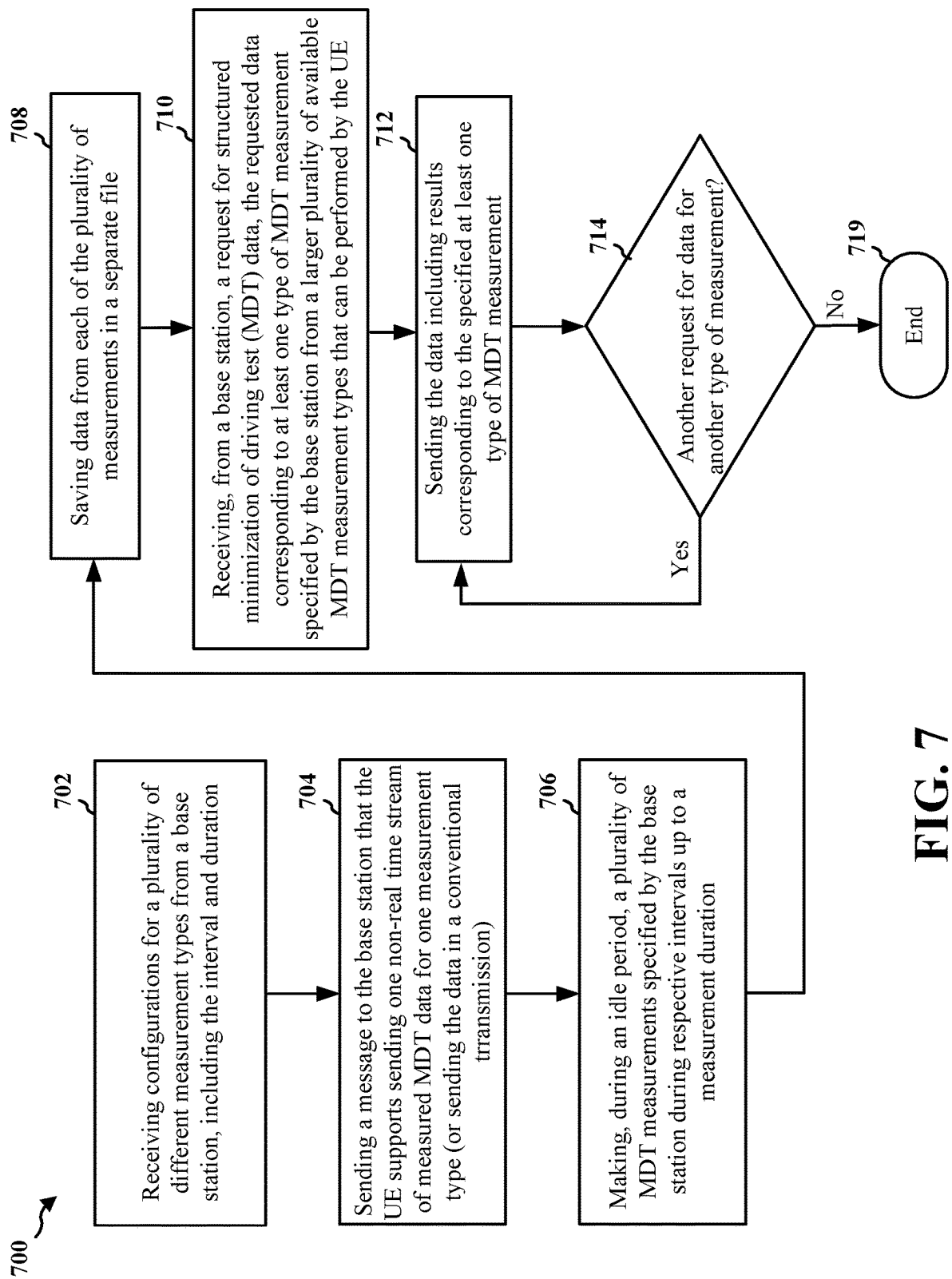
FIG. 7 is a flowchart of a method of wireless communication.

FIG. 7 is a flowchart 700 of a method of wireless communication. At step 702, a UE (such as the UE 104, 350 or 604 of FIG. 1, 3 or 6, respectively) may receive configurations from a base station (such as the base station 102/180, 310, or 602 of FIG. 1, 3 or 6, respectively) receives configurations for a plurality of different MDT measurement types from a base station. This information may specify the measurement intervals and duration. These measurement types may typically represent all of the different measurement types for which the network anticipates needing data over a subsequent period of time. At step 704, the UE may optionally send a message to the base station that the UE supports the capability of sending one non-real time stream of measured MDT data for one measurement type. In other configurations, the data may be transmitted directly, without using MDT streaming. As noted above, this information may be included elsewhere in the process flow, and in some configurations it may already be understood.

Next, at step 706, the UE can make or perform, during an ensuing idle period of the UE, the corresponding plurality of MDT measurements specified by the base station in step 702. At step 708, which may be performed concurrently with the procedures of step 706, the UE may log these measurements during respective intervals by saving data obtained from each of the measurements in a separate file. The UE may perform measurements for all configured measurement types up to the total specified measurement duration.

At step 710, the UE may receive, from the base station, a request for structured minimization of driving test (MDT) data, the requested data corresponding to at least one type of MDT measurement specified by the base station from a larger plurality of available MDT measurement types that can be performed by the UE. For example, in some embodiments, the UE may receive, from a base station during a period such as during a subsequent RRC connection, a request for MDT data specifying a report for at least one type of MDT measurement from a larger number of MDT measurement types. Responsive to step 710, the UE may send the data including results corresponding to the specified at least one type of MDT measurement to the base station at step 712. For example, in some embodiments, the UE can send at step 712 a report with the requested measurement type to the base station. If data corresponding to more than one type of measurement was requested by the base station, the UE may successively send one or more non-real time data streams or other transmissions corresponding to those one or more additional requested measurement types, one data stream at a time until all streams are transmitted and the base station successfully receives them.

The base station may optionally include in the message of step 710 an indication that it supports receiving MDT streams. In other configurations, the base station may provide this information at an earlier time.

If, during some specified time of network operation, for example, there are no further MDT measurement type requests from the base station (step 714), then the process can end 719 at least until another such request is made or the UE receives another configuration. If, however, at step 714 the UE receives another request for data corresponding to another type (or other types) of MDT measurements required by the network, the UE again may send one non-real time data stream corresponding to one measurement type, then another data stream corresponding to another measurement type if applicable, and so on until the data is provided to the base station.

Figure 8:
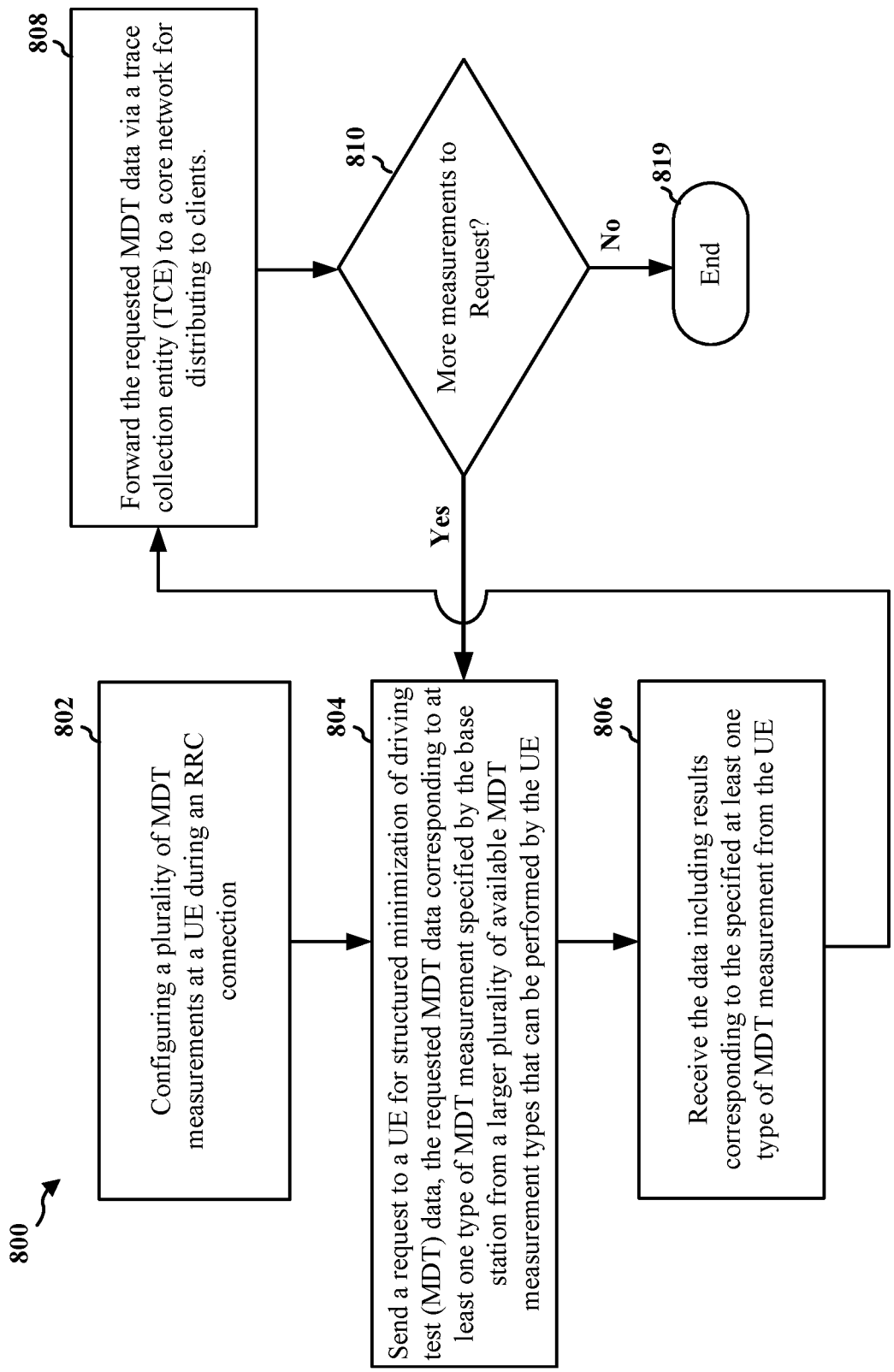
FIG. 8 is a flowchart of a method of wireless communication.

FIG. 8 is a flowchart of a method of wireless communication from the perspective of the base station (such as the base station identified in FIG. 7, 6, 3 or 1, described above, for example). At step 802, the base station may transmit to a UE (such as the UE identified in FIG. 7, 6, 3 or 1, described above) during an RRC connection MDT measurement configurations for a plurality of MDT measurements to be performed and logged by the UE. Subsequently, upon receiving a notification from the UE that the configured measurements were logged, for example, the base station at step 804 may send a request to a UE for structured minimization of driving test (MDT) data, the requested MDT data corresponding to at least one type of MDT measurement specified by the base station from a larger plurality of available MDT measurement types that can be performed by the UE. For instance, in some embodiments, the base station may send a structured MDT measurement type request to the UE for a type of MDT measurement data during another RRC connection. In some configurations, the MDT measurement type request may include a data bit or other indication that the base station supports receiving the MDT information in a measurement-type specific data stream.

Responsive to the request (804), the base station may at step 806 receive the data including results corresponding to the specified at least one type of MDT measurement from the UE. For instance, in some embodiments, the base station may receive from the UE a non-real time data stream or other type of transmission corresponding to the requested type of measurement. If the base station identified multiple measurement types at request 804, the base station may receive a plurality of sequential data streams, each data stream corresponding to a measurement report for a single measurement type identified by the base station. Further at step 806, the base station may receive the data including results corresponding to the specified at least one type of MDT measurement from the UE. For example, the base station may receive the one or more data streams or other transmissions and save data from each of them to a separate file.

The base station may also identify, along with the requested MDT data, TCE addresses from the data streams or other transmissions. Accordingly, at step 808, the base station may forward the requested MDT data via a trace collection entity (TCE) to a core network for distributing to clients. For example, the base station may extract information from each of the one or more data streams or other data transmissions to identify the intended TCE recipient as described above. Using this information, the base station may send the received data in a data stream or other transmission type to the TCE for forwarding to the appropriate client or entity that may require the information. In some implementations, the base station may be configured to transmit the received data directly to the entity that requested data for that measurement type. If the base station receives multiple data streams in sequence corresponding to a request for multiple measurement types, the base station, in an exemplary implementation, may send each received data stream, such as in the form of a file, for example, to the TCE for routing to the intended entity.

The base station may subsequently determine, or the base station may be subsequently informed by the network, that another one or more measurement reports corresponding to additional data types configured by the base station may be needed (810). If so, the base station may return to step 804 to issue a new MDT measurement type request identifying the new data types, and the process resumes from step 804 as described above. If no other MDT data is requested, the process ends (819) until such time that another request is made, or the UE is reconfigured, etc.

In one optional implementation, a new information element may be added as an information element (IE) that can represent a basis for writing code to identify the type(s) of measurement for which a measurement report is required. In this example implementation, an octet bit string (XXXXXXXX) may be used to enable the base station to identify the type of measurement. Thus, for instance, a Bluetooth measurement may be represented by the fourth bit position in the octet (i.e., XXXX_X_XXX), and a WLAN measurement may be represented by the seventh bit position (XXXXXX_X_X). The measurement types may be enabled by setting the relevant bits to "1" or "true". In the example where the base station is requesting MDT information in the MDT information type request for the Bluetooth and WLAN MDT tests, the base station may provide the bit string 01001000, for example, which identifies those to tests.

An MDT information type request may optionally include the following IE for a 5G NR network, for example.

UEInformationRequest-v1020-IEs::=SEQUENCE {
   logMeasReportReq-r10ENUMERATED
     {true}OPTIONAL, —Need ON
   nonCriticalExtensionUEInformationRequest-v1130-
     IEsOPTIONAL
}
UEInformationRequest-v17xy-IEs::=SEQUENCE {
   MDT_measurement_StreamsOCTET   STRINGOPTIONAL, —Need ON
   nonCriticalExtensionUEInformationRequest-v17xz-
     IEsOPTIONAL
}
//Octet String—Bitmap to enable bit 1 for corresponding Stream ID to be enabled for MDT reporting The octet in the example above can be predefined to have any value from 0 to 7. Specifying a 1 enables a stream ID corresponding to the MDT measurement type. In configurations where additional measurement types are required, a larger bit string, or multiple bit strings, can be used. Code or hardware that may implement this IE or a similar IE can be used to define the MDT measurement type to be selected in an actual device. The MDT Stream from the UE can be tagged with a stream ID, (e.g., cell measurements, MDT Stream (serving and neighbors), IRAT measurement stream, MBSFN MDT measurement stream, WLAN MDT measurement stream, BT MDT measurement stream, and the like) to distinguish between different types of MDT information.

As noted above, the base station may inform the UE that the base station supports the selective MDT report capability. A data bit or other indicator may be added to the base station's MDT measurement type report. Accordingly, an IE indicating non-real time MDT streaming support can be optionally added as follows:

```
}
UE-NR-Capability-17xy ::=                    SEQUENCE {
    Logged MDT-MeasurementType Support    Boolean
    {True/False}
    nonCriticalExtension                  SEQUENCE { }
    OPTIONAL
}
```

In the underscored portion of the above IE, the Boolean value can be optionally set to "true" to indicate non real-time MDT streaming capability. Once this bit is set to true, then the base station can issue the MDT measurement type request.

It should be understood that the IEs above are exemplary only, and other IEs or hardware and software implementations are possible for use in various configurations described in this disclosure. Thus the IEs are not intended to be limiting, but rather purely illustrative in nature.

Figure 9:
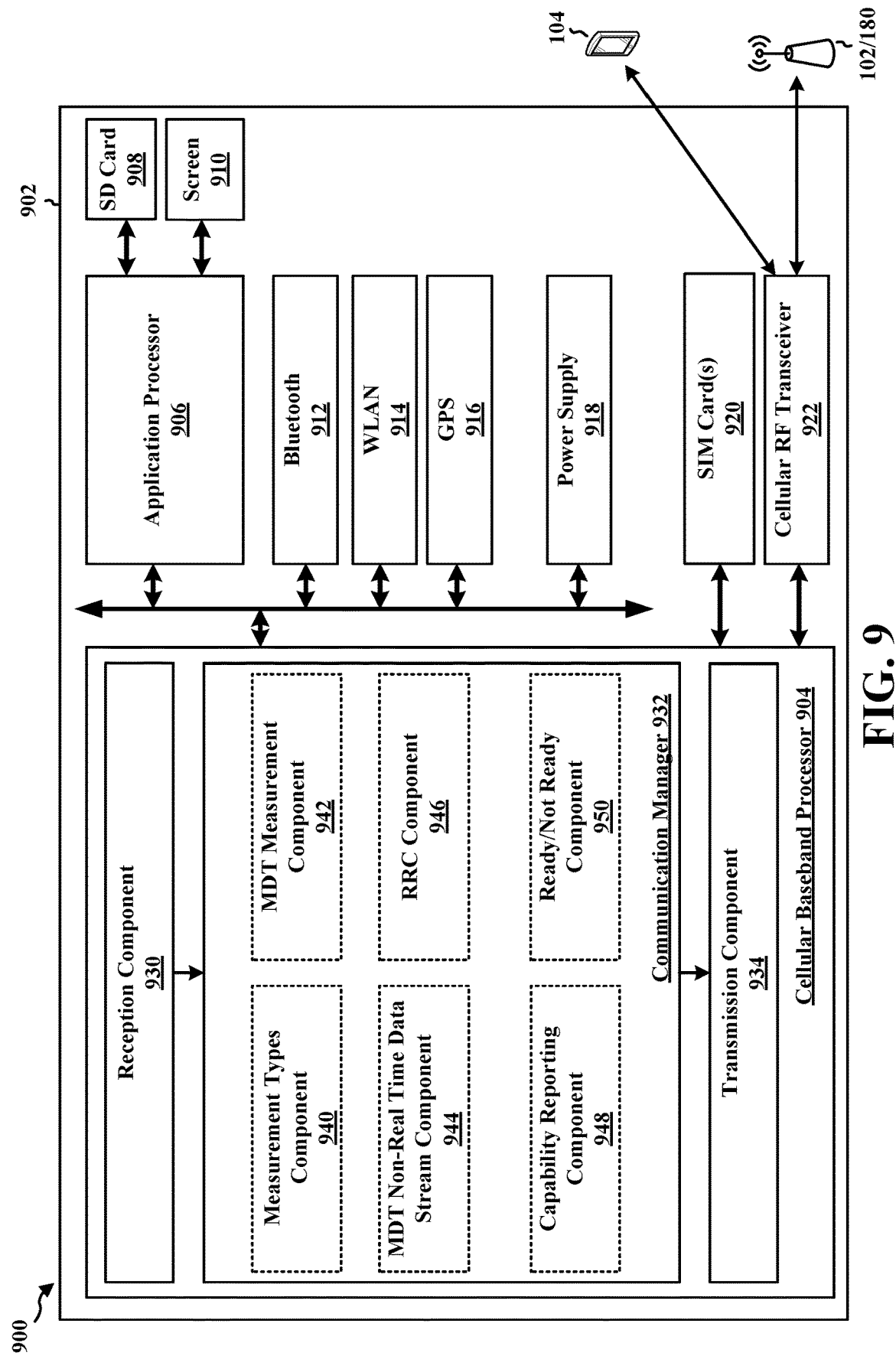
FIG. 9 is a diagram illustrating an example of a hardware implementation for an example UE.

FIG. 9 is a diagram illustrating an example of a hardware implementation 900 for an example UE 902. The UE 902 may include a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 may communicate through the cellular RF transceiver 922 with the UE 104 and/or base station 102/180. The cellular baseband processor 904 may include a computer-readable medium/memory. The computer-readable medium/memory may be non-transitory. The cellular baseband processor 904 may be responsible for general processing, including the execution of software stored on the computer-readable medium/memory. The software, when executed by the cellular baseband processor 904, may cause the cellular baseband processor 904 to perform the various functions described throughout this disclosure. The computer-readable medium/memory may also be used for storing data that is manipulated by the cellular baseband processor 904 when executing software. The cellular baseband processor 904 may further include a reception component 930, a communication manager 932, and a transmission component 934. The communication manager 932 may include the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. The UE 902 may include a modem chip and the baseband processor 904, and may include the aforediscussed additional modules of the UE 902.

The communication manager 932 can include a measurement types component 940 that may be internal to the UE and that may be used as needed to store data and code used to assist in performing MDT measurements. The communication manager 932 can further include an MDT measurement component 942 that optionally receives input in the form of information and code from component 940 for performing different measurements and that also optionally receives information from the reception component 930 such as MDT configurations from the base station. The MDT measurement component 940 may be configured to receive MDT configuration information, including measurement intervals and a measurement duration as described in step 702 from FIG. 7 and signal(s) 610 from FIG. 6. The MDT measurement component 942 may be configured to perform the different types of MDT measurements over the measurement intervals and the MDT duration provided by the base station 180, as shown in step 706 of FIG. 7 and block 614 of FIG. 6. The MDT measurement component 942 may also use input in the form of UE-specific measurement information from the measurement types component 940. The MDT measurement component 942 is also configured to perform these measurements when the UE 104 is in an idle state. The MDT measurement component 942 may be configured to log the measurement data, including storing information corresponding to different types of measurements into different respective data files, e.g., as described in connection with step 706 and 708 of FIG. 7 and blocks 612 and 614 of FIG. 6.

The communication manager 932 may further include a non-real time MDT data stream component 944 that can receive input in the form of measurement data from the component 942 and that may be configured to receive MDT measurement type requests from the base station during an RRC connection, e.g., as described in connection with step 710 of FIG. 7 and signal(s) 620 of FIG. 6. The MDT data stream component 944 may be configured to receive an indication in the measurement type request that the base station supports receiving MDT type-specific data streams, e.g., as is also shown in step 7 of FIG. 7. Responsive to one of these requests, MDT data stream component 944 may be configured to send a non-real time data stream to the base station 180 which includes measurement data corresponding to the information requested in the MDT measurement type request, e.g., as shown in step 712 of FIG. 7 and signal 622 of FIG. 6. Component 944 may also be configured, in the case where the base station identifies in the MDT measurement type request more than one type of MDT measurement, to send different non-real time data streams during successive time periods, with each data stream corresponding to one data type, e.g., as shown in steps 710, 712 and 714 of FIG. 7 and signal 622 and block 647 of FIG. 6.

The communication manager 932 may further include an RRC component 946 that can receive input in the form of RRC connection/release requests from the reception component 930 and is configured to establish or release an RRC connection. The communication manager 932 may further include a capability reporting component 948 that receives input in the form of a configuration message or an MDT measurement type request from the components 942 and 944 and is configured to optionally send an indication to the base station that the UE is capable of MDT measurement-type specific data streaming, e.g., as described in connection with step 704 of FIG. 7 and signal 641 and block 645 of FIG. 6. The communication manager 932 further may include a ready/not ready component 950 that receives input from the MDT data stream component 944 in the form of an MDT measurement type request and that is configured to indicate to the base station that it is ready or not ready, or not capable, of sending the requested data stream, e.g., as show in signal 621 of FIG. 6.

The UE may include additional components that perform each of the blocks of the algorithm in the aforementioned timing diagram and flowchart of FIGS. 6 and 7, respectively. As such, each block in the aforementioned timing diagrams and flowcharts of FIGS. 6 and 7, respectively, may be performed by a component and the UE may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the UE 902, and in particular the cellular baseband processor 904, includes means for receiving, from a base station, a request for minimization of driving test (MDT) data corresponding to a type of measurement by the UE, means for sending a data stream comprising the requested data to the base station, means for making a plurality of MDT measurements specified by the base station, and means for saving each of the plurality of measurements in a separate file. The aforementioned means may be one or more of the aforementioned components of the UE 902 configured to perform the functions recited by the aforementioned means. As described above, the UE 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
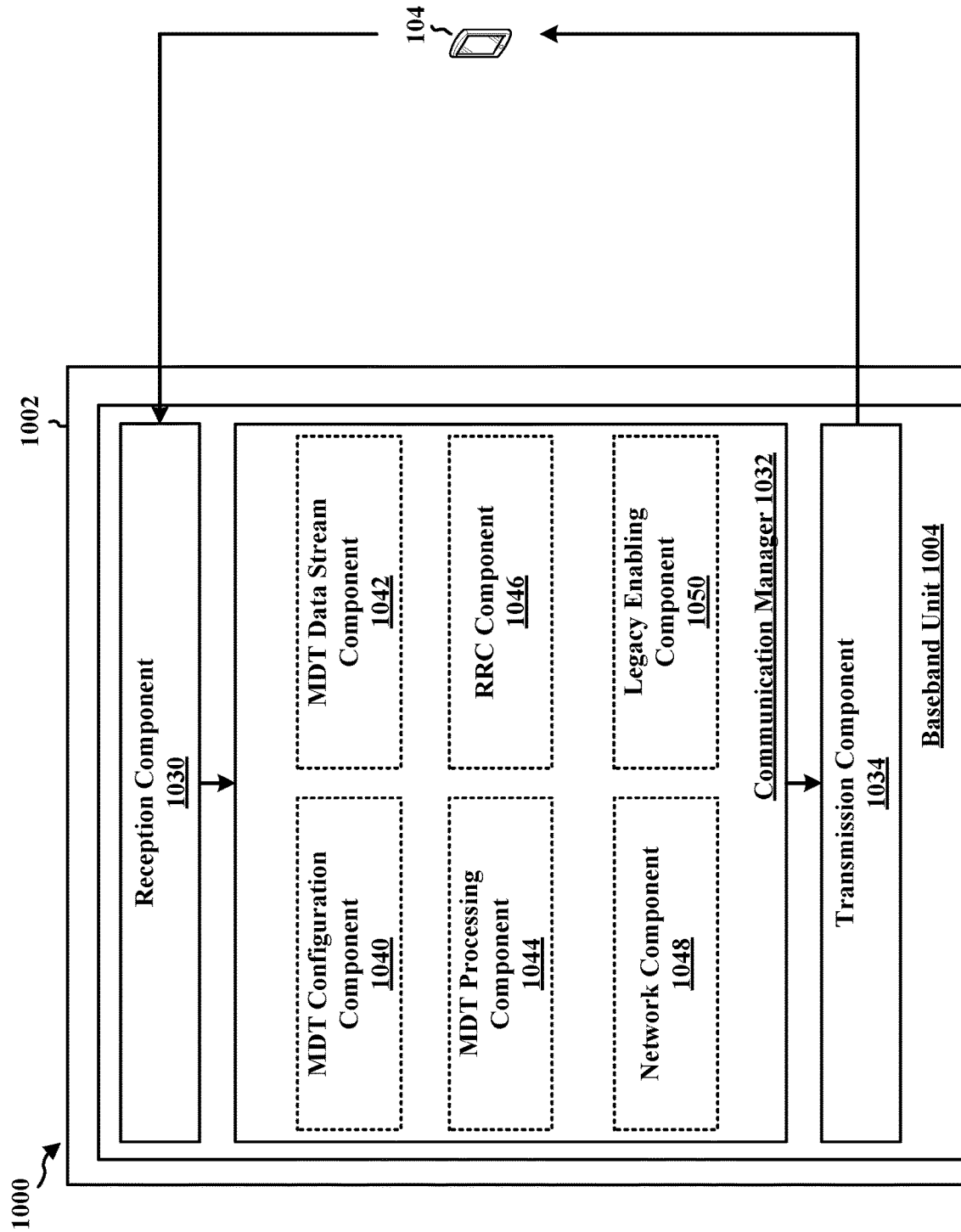
FIG. 10 is a diagram illustrating an example of a hardware implementation for an example base station.

FIG. 10 is a diagram 1000 illustrating an example of a hardware implementation for a base station 1002. The base station 1002 includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described above. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 may include an MDT configuration component 1040 that is configured to send an MDT configuration message to a UE for configuring a plurality of different MDT measurement types for the UE to perform, as well as to provide the UE with specified measurement intervals and an MDT measurement duration, e.g., as described in connection with step 802 of FIG. 8 and step 610 and block 630 of FIG. 6. The communication manager 1032 further includes an MDT data stream component 1042 that receives input in the form of MDT measurement configuration type, measurement parameters, and measurement intervals and duration from the MDT configuration component 1040, and that is configured to send an MDT measurement type message to the UE e.g., as described in connection with steps 804 and 810 of FIG. 8 and signal 620 of FIG. 6. The communication manager 1032 further includes an MDT processing component 1044 that is configured to receive input in the form of data streams from component 1042 and is configured to receive the data streams and optionally save them into individual files, e.g., as described in connection with step 806 of FIG. 8. The communication manager 932 may further include an RRC component 1046 that receives input in the form of RRC connection/release requests from the reception component 1030 and is configured to establish or release an RRC connection. The communication manager 932 further receives a network component 1048 that is configured to receive input in the form of data streams from component 1042 and/or data files from component 1044 and to extract TCE information from the data to identify a TCE address for sending the data file to the correct TCE entity, e.g., as described in connection with step 808 of FIG. 8 and signals 622, 626 and 628 and block 624 of FIG. 6. The communication manager 932 further receives a legacy enabling component 1050 that receives input from the reception component 1030 in the form of information as to the measurement-type data streaming capabilities, or lack thereof, sent from the UE.

The base station may include additional components that perform each of the blocks of the algorithm in the aforementioned timing diagram and flowchart of FIGS. 6 and 8, respectively. As such, each block in the aforementioned flowcharts of FIGS. 6 and 8, respectively, may be performed by a component and the base station may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the base station 1002, and in particular the baseband unit 1004, includes means for sending a request to a UE for minimization of driving test (MDT) data corresponding to a type of measurement by the UE, and means for receiving a stream comprising the requested data corresponding to the type of measurement. The aforementioned means may be one or more of the aforementioned components of the base station 1002 configured to perform the functions recited by the aforementioned means. As described above, the base station 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

As noted, one or more aspects of the present disclosure may enable the network to selectively identify requested data for MDT measurements that are pertinent at the time of request, thereby reducing or eliminating the network resources expended on filtering the data. The data can also be streamed from the UE on a type-specific basis. As a result, the data streams can be far smaller than the conventional data file inclusive of all measurements and the possibility of requiring that the streamed data be segmented is reduced or eliminated. This in turn can reduce or eliminate the resource bottlenecks associated with excessive RRC signaling. Additionally, the problem regarding the power drain on the battery may be mitigated or solved.

The following aspects are illustrative only and may be combined with aspects of other embodiments or teachings described herein, without limitation.

Aspect 1 is a method of wireless communication of a user equipment (UE), comprising receiving, from a base station, a request for structured minimization of driving test (MDT) data, the requested data corresponding to at least one type of MDT measurement specified by the base station from a larger plurality of available MDT measurement types that can be performed by the UE, and sending the data including results corresponding to the specified at least one type of MDT measurement to the base station.

Aspect 2 is the method of aspect 1, wherein sending the data to the base station further comprises sending a structured report identifying the at least one specified type of MDT measurement.

Aspect 3 is the method of any of aspects 1 and 2, further comprising performing a measurement corresponding to the specified at least one type of MDT measurement.

Aspect 4 is the method of any of aspects 1-3, further comprising sending the data to the base station over a control plane.

Aspect 5 is the method of any of aspects 1-4, wherein the requested MDT data includes results specific to at least one type of MDT measurement specified by the base station.

Aspect 6 is the method of any of aspects 1-5, wherein the request for the structured MDT data comprises an indication that the base station supports non-real time streaming MDT data.

Aspect 7 is the method of any of aspects 1-6, further comprising sending, to the base station, information comprising a capability bit to indicate selective MDT report support.

Aspect 8 is the method of any of aspects 1-7, further comprising receiving, after sending the data, another request from the base station for structured MDT data including results corresponding to another type of MDT measurement specified by the base station; and sending the requested data to the base station corresponding to the another type of MDT measurement.

Aspect 9 is the method of any of aspects 1-8, further comprising performing a measurement corresponding to the at least one type of MDT measurement specified by the base station, saving results of the measurement in a separate file, and sending the separate file including the results to the base station.

Aspect 10 is the method of any of aspects 1-9, further comprising sending a message to the base station indicating that the UE is not ready to transmit the requested MDT data, wherein the results are later sent to the base station when the UE is ready.

Aspect 11 is the method of any of aspects 1-10, wherein the message includes a UE assistance information message sent in response to the request for the structured MDT data for notifying the base station that the UE is not currently ready or capable to transmit the requested MDT data.

Aspect 12 is the method of any of aspects 1-11, wherein the results are sent using non-real time data streaming.

Aspect 13 is an apparatus of a user equipment (UE), the UE including the means for performing the functions in any of aspects 1-12.

Aspect 14 is a computer-readable medium storing executable code, the code when executed by a processor causing the processor to perform any of the aspects 1-12.

Aspect 15 is a user equipment (UE), comprising a memory, and at least one processor coupled to the memory and configured to receive, from a base station, a request for structured minimization of driving test (MDT) data, the requested data corresponding to at least one type of MDT measurement specified by the base station from a larger plurality of available MDT measurement types that can be performed by the UE, and send the data including results corresponding to the specified at least one type of MDT measurement to the base station.

Aspect 16 is the UE of aspect 15, wherein the at least one processor is further configured to send a structured report identifying the at least one specified type of MDT measurement.

Aspect 17 is the UE of any of aspects 15 and 16, wherein the at least one processor is further configured to perform a measurement corresponding to the specified at least one type of MDT measurement.

Aspect 18 is the UE of any of aspects 15-17, wherein the at least one processor is further configured to send the data to the base station over a control plane.

Aspect 19 is the UE of any of aspects 15-18, wherein the requested MDT data includes results specific to at least one type of MDT measurement specified by the base station.

Aspect 20 is the UE of any of aspects 15-19, wherein the at least one processor is further configured to perform a measurement corresponding to the at least one type of MDT measurement specified by the base station, save results of the measurement in a separate file, and send the separate file including the results to the base station.

Aspect 21 is the UE of any of aspects 15-20, wherein the at least one processor is further configured to send a message to the base station indicating that the UE is not ready to transmit the requested MDT data, wherein the results are later sent to the base station when the UE is ready.

Aspect 22 is the UE of any of aspects 15-21, wherein the message includes a UE assistance information message sent in response to the request for the structured MDT data and configured to notify the base station that the UE is not currently ready or capable to transmit the requested MDT data.

Aspect 23 is the UE of any of aspects 15-22, wherein the results are sent using non-real time data streaming.

Aspect 24 is a method of wireless communication of a base station, comprising sending a request to a UE for structured minimization of driving test (MDT) data, the requested MDT data corresponding to at least one type of MDT measurement specified by the base station from a larger plurality of available MDT measurement types that can be performed by the UE, and receiving the data including results corresponding to the specified at least one type of MDT measurement from the UE.

Aspect 25 is the method of aspect 24, further comprising forwarding the requested MDT data via a trace collection entity (TCE) to a core network for distributing to clients.

Aspect 26 is the method of any of aspects 24 or 25, wherein the requested MDT data comprises a plurality of measurement types.

Aspect 27 is the method of any of aspects 24-26, wherein the received data comprises a structured report identifying the specified at least one type of MDT measurement.

Aspect 28 is the method of any of aspects 24-27, further comprising sending, after receiving the requested MDT data, another request to the UE for structured MDT data including results corresponding to another specified type of MDT measurement, and receiving data from the UE corresponding to the another specified type of MDT measurement.

Aspect 29 is the method of any of aspects 24-28, further comprising receiving the data from the UE over a control plane.

Aspect 30 is the method of any of aspects 24-29, wherein the requested MDT data includes results specific to one type of measurement specified by the base station.

Aspect 31 is the method of any of aspects 24-30, further comprising receiving a message from the UE indicating that the UE is not ready to transmit the requested MDT data, wherein the data is later received at the base station.

Aspect 32 is an apparatus at a base station, the apparatus including means for performing the functions of any of aspects 24-30.

Aspect 33 is a computer-readable medium storing executable code, the code when executed by a processor causing the processor to perform any of the aspects 24-30.

Aspect 34 is a base station, comprising a memory, and at least one processor coupled to the memory and configured to send a request to a UE for structured minimization of driving test (MDT) data, the requested MDT data corresponding to at least one type of MDT measurement specified by the base station from a larger plurality of available MDT measurement types that can be performed by the UE, and receive the data including results corresponding to the specified at least one type of MDT measurement from the UE.

Aspect 35 is the base station of aspect 34, wherein the processor is further configured to forward the requested MDT data via a trace collection entity (TCE) to a core network for distributing to clients.

Aspect 36 is the base station of any of aspects 34 and 35, wherein the requested MDT data comprises a plurality of measurement types.

Aspect 37 is the base station of any of aspects 34-36, wherein the received data comprises a structured report identifying the specified at least one type of MDT measurement type.

Aspect 38 is the base station of any of aspects 34-37, wherein the processor is further configured to send, after receiving the requested MDT data, another request to the UE for structured MDT data corresponding to another specified type of MDT measurement, and receive data from the UE corresponding to the another specified type of MDT measurement.

Aspect 39 is the base station of any of aspects 34-38, wherein the at least one processor is further configured to receive the data from the UE over a control plane.

Aspect 40 is the base station of any of aspects 34-39, wherein the requested MDT data includes results specific to one type of measurement specified by the base station.

Aspect 41 is the base station of any of aspects 34-40, wherein the received data comprises a structured report identifying the results for the specified at least one type of MDT measurement.

Aspect 42 is the base station of any of aspects 34-41, wherein the at least one processor is further configured to receive a message from the UE indicating that the UE is not ready to transmit the requested MDT data.

Aspect 43 is a user equipment (UE), comprising a memory, and at least one processor coupled to the memory and configured to perform any of the aspects 1-12.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving, from a base station, a request for structured minimization of driving test (MDT) data, the requested data corresponding to at least one type of MDT measurement specified by the base station from a larger plurality of available MDT measurement types that can be performed by the UE, the request for the structured MDT data including an indication that the base station supports non-real time streaming MDT data based on a uniform resource identifier (URI), a hypertext transfer protocol (HTTP), or HTTP Secure (HTTPS); and
   sending the data specific to the at least one type of MDT measurement type specified by the base station as a single file in a structured report, the data including results corresponding to the specified at least one type of MDT measurement to the base station.

2. The method of claim 1, wherein the at least one type of MDT measurement is specified by the base station at a time of sending the request.

3. The method of claim 1, further comprising performing a measurement corresponding to the specified at least one type of MDT measurement.

4. The method of claim 1, further comprising sending the data to the base station over a control plane.

5. The method of claim 1, wherein the requested MDT data includes results specific to at least one type of MDT measurement specified by the base station.

6. The method of claim 1, further comprising sending, to the base station, information comprising a capability bit to indicate selective MDT report support.

7. The method of claim 1, further comprising:
   receiving, after sending the data, another request from the base station for structured MDT data including results corresponding to another type of MDT measurement specified by the base station; and
   sending the requested data to the base station corresponding to the another type of MDT measurement.

8. The method of claim 1, further comprising:
   performing a measurement corresponding to the at least one type of MDT measurement specified by the base station;
   saving results of the measurement in a separate file; and
   sending the separate file including the results to the base station.

9. The method of claim 1, further comprising:
   sending a message to the base station indicating that the UE is not ready to transmit the requested MDT data, wherein the results are later sent to the base station when the UE is ready.

10. The method of claim 9, wherein the message includes a UE assistance information message sent in response to the request for the structured MDT data for notifying the base station that the UE is not currently ready or capable to transmit the requested MDT data.

11. The method of claim 1, wherein the results are sent using non-real time data streaming.

12. A user equipment (UE), comprising:
a memory; and
at least one processor coupled to the memory and configured to:
receive, from a base station, a request for structured minimization of driving test (MDT) data, the requested data corresponding to at least one type of MDT measurement specified by the base station from a larger plurality of available MDT measurement types that can be performed by the UE, the request for the structured MDT data including an indication that the base station supports non-real time streaming MDT data based on a uniform resource identifier (URI), a hypertext transfer protocol (HTTP), or HTTP Secure (HTTPS); and
send the data specific to the at least one type of MDT measurement type specified by the base station as a single file in a structured report, the data including results corresponding to the specified at least one type of MDT measurement to the base station.

13. The UE of claim 12, wherein the at least one type of MDT measurement is specified by the base station at a time of sending the request.

14. The UE of claim 12, wherein the at least one processor is further configured to perform a measurement corresponding to the specified at least one type of MDT measurement.

15. The UE of claim 12, wherein the at least one processor is further configured to send the data to the base station over a control plane.

16. The UE of claim 12, wherein the requested MDT data includes results specific to at least one type of MDT measurement specified by the base station.

17. The UE of claim 12, wherein the at least one processor is further configured to:
perform a measurement corresponding to the at least one type of MDT measurement specified by the base station;
save results of the measurement in a separate file; and
send the separate file including the results to the base station.

18. The UE of claim 12, wherein the at least one processor is further configured to send a message to the base station indicating that the UE is not ready to transmit the requested MDT data,
wherein the results are later sent to the base station when the UE is ready.

19. The UE of claim 18, wherein the message includes a UE assistance information message sent in response to the request for the structured MDT data and configured to notify the base station that the UE is not currently ready or capable to transmit the requested MDT data.

20. The UE of claim 12, wherein the results are sent using non-real time data streaming.

21. A method of wireless communication of a base station, comprising:

sending a request to a UE for structured minimization of driving test (MDT) data, the requested MDT data corresponding to at least one type of MDT measurement specified by the base station from a larger plurality of available MDT measurement types that can be performed by the UE, the request for the structured MDT data including an indication that the base station supports non-real time streaming MDT data based on a uniform resource identifier (URI), a hypertext transfer protocol (HTTP), or HTTP Secure (HTTPS); and
receiving the data specific to the at least one type of MDT measurement type specified by the base station as a single file in a structured report, the data including results corresponding to the specified at least one type of MDT measurement from the UE.

22. The method of claim 21, further comprising forwarding the requested MDT data via a trace collection entity (TCE) to a core network for distributing to clients.

23. The method of claim 21, wherein the requested MDT data comprises a plurality of measurement types.

24. The method of claim 21, wherein the at least one type of MDT measurement is specified by the base station at a time of sending the request.

25. The method of claim 21, further comprising:
sending, after receiving the requested MDT data, another request to the UE for structured MDT data including results corresponding to another specified type of MDT measurement; and
receiving data from the UE corresponding to the another specified type of MDT measurement.

26. The method of claim 21, further comprising receiving the data from the UE over a control plane.

27. The method of claim 21, wherein the requested MDT data includes results specific to one type of measurement specified by the base station.

28. The method of claim 21, further comprising receiving a message from the UE indicating that the UE is not ready to transmit the requested MDT data,
wherein the data is later received at the base station.

29. A base station, comprising:
a memory; and
at least one processor coupled to the memory and configured to:
send a request to a UE for structured minimization of driving test (MDT) data, the requested MDT data corresponding to at least one type of MDT measurement specified by the base station from a larger plurality of available MDT measurement types that can be performed by the UE, the request for the structured MDT data including an indication that the base station supports non-real time streaming MDT data based on a uniform resource identifier (URI), a hypertext transfer protocol (HTTP), or HTTP Secure (HTTPS); and
receive the data specific to the at least one type of MDT measurement type specified by the base station as a single file in a structured report, the data including results corresponding to the specified at least one type of MDT measurement from the UE.

* * * * *